United States Patent
Godfrey et al.

(10) Patent No.: US 9,586,257 B2
(45) Date of Patent: Mar. 7, 2017

(54) COMBINATION COLLAR FEEDER AND SWAGING TOOL

(71) Applicant: GAGE BILT, INC., Clinton Township, MI (US)

(72) Inventors: Bruce T. Godfrey, Royal Oak, MI (US); Brian H. Leigh, Macomb, MI (US); Tony P. Potts, Warren, MI (US)

(73) Assignee: Gage Bilt, Inc., Clinton Township, MI (US)

( * ) Notice: Subject to any disclaimer, the term of this patent is extended or adjusted under 35 U.S.C. 154(b) by 197 days.

(21) Appl. No.: 14/569,859

(22) Filed: Dec. 15, 2014

(65) Prior Publication Data

US 2016/0167108 A1   Jun. 16, 2016

(51) Int. Cl.
| | | |
|---|---|---|
| *B21J 15/32* | (2006.01) | |
| *B21J 15/02* | (2006.01) | |
| *B23P 19/06* | (2006.01) | |

(52) U.S. Cl.
CPC ............ *B21J 15/022* (2013.01); *B21J 15/32* (2013.01); *B23P 19/06* (2013.01)

(58) Field of Classification Search
CPC ........ B21J 15/022; B21J 15/06; B21J 15/105; B21J 15/32; B23P 19/001; B23P 19/006; B25B 23/06; F16B 19/05; Y10T 29/49948; Y10T 29/4995; Y10T 29/49954; Y10T 29/49956; Y10T 29/53487; Y10T 29/53496
See application file for complete search history.

(56) References Cited

U.S. PATENT DOCUMENTS

| | | | |
|---|---|---|---|
| 4,417,688 A | 11/1983 | Schnaibel et al. | |
| 4,604,889 A * | 8/1986 | Sukharevsky | B21J 15/105 227/112 |
| 4,852,376 A | 8/1989 | Suhov | |
| 5,142,774 A | 9/1992 | Jeffery | |
| 5,167,327 A | 12/1992 | Mondello | |
| 5,385,434 A | 1/1995 | Quinn et al. | |
| 5,490,311 A | 2/1996 | Rosier | |
| 5,697,521 A | 12/1997 | Dixon | |
| 6,253,448 B1 | 7/2001 | Zieve et al. | |
| 6,907,648 B2 | 6/2005 | Eldessouky | |
| 9,296,076 B2 * | 3/2016 | Soto Martinez | B23P 19/005 |
| 2011/0252626 A1 | 10/2011 | Williams | |
| 2011/0289769 A1 | 12/2011 | Skolaude | |
| 2013/0247890 A1 | 9/2013 | Gilley | |
| 2014/0201972 A1 | 7/2014 | Butvin et al. | |
| 2015/0184689 A1 | 7/2015 | Godfrey et al. | |

OTHER PUBLICATIONS

U.S. Appl. No. 14/335,145, filed Jul. 18, 2014.

* cited by examiner

*Primary Examiner* — Edward Tolan
(74) *Attorney, Agent, or Firm* — Young Basile Hanlon & MacFarlane, P.C.

(57) ABSTRACT

A combination collar feeder and swaging tool for installing lockbolt fasteners. The collar feeder is mounted on the tool to present collars one-by-one from a cartridge. After placing a collar on a lockbolt shank, the feeder moves out of alignment with the nose assembly to allow it to advance onto the collar for swaging purposes.

4 Claims, 6 Drawing Sheets

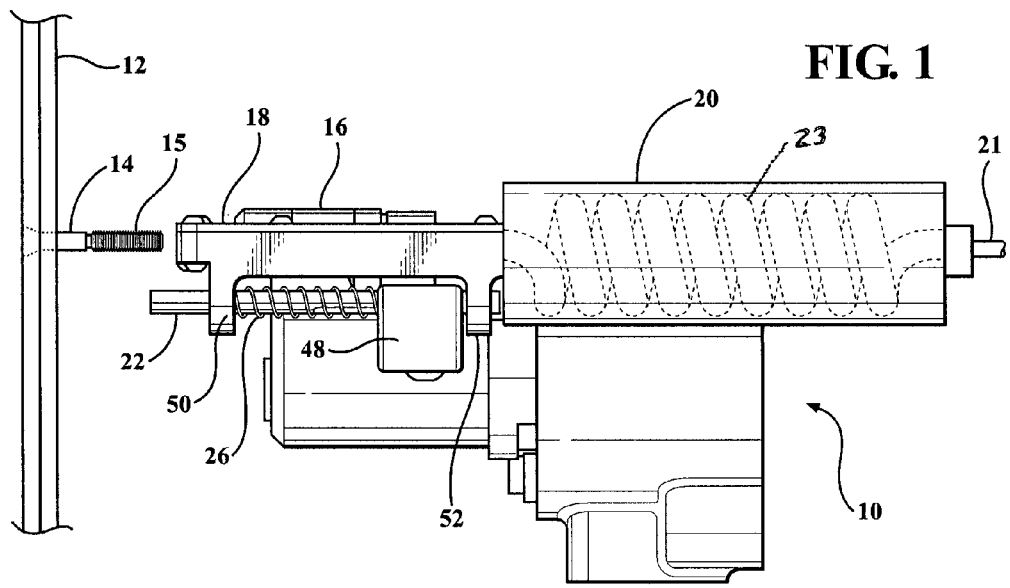
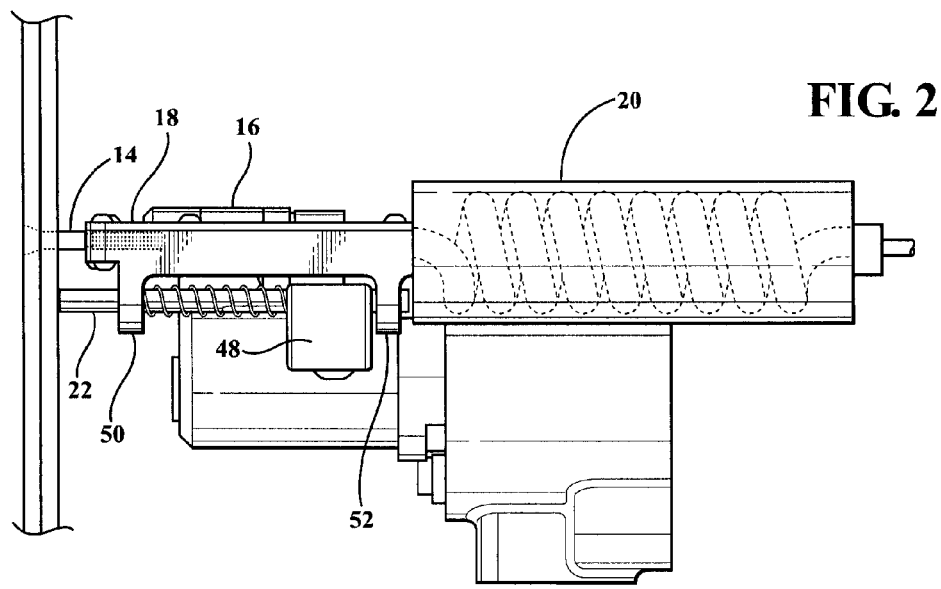

COMBINATION COLLAR FEEDER AND SWAGING TOOL

FIELD OF THE INVENTION

The invention relates to tools for placing swagable collars on lockbolt shanks and swaging the collars so placed in what is essentially a single tool stroke.

BACKGROUND OF THE INVENTION

It is well known to secure two or more structural components together using lockbolts of the type having heads and shanks wherein the shanks are adapted to receive a swagable metal collar which, after proper placement, is inelastically deformed into secure engagement with the lockbolt shank. The lockbolt may or may not have a "pintail" adapted to be snapped off and discarded after the collar has been swaged.

Normally, the placement of a shank or collar on the pintail and the subsequent swaging of the collar are performed as separate and distinct operations. Where the orientation of the lockbolts allows for it, an operator often places a series of collars on a closely spaced series of lockbolt shanks, and then serially applies the swaging tool to the collars, one by one. This operation is then repeated.

Using the collar feeder described in our co-pending application, Ser. No. 14/335,145 filed Jul. 18, 2014, it is possible for an operator to place collars in position on lockbolt pintails with one hand and subsequently apply the swaging tool to the collar with the other hand. The collar feeder can be attached to a cartridge or magazine loaded with collars. This makes the operation faster and more efficient.

SUMMARY OF THE INVENTION

In accordance with the present invention, swagable lockbolt collar placement and swaging functions may be performed in what is essentially a single tool maneuver that can be repeated from one lockbolt to the next in an efficient and less tiring fashion.

Briefly described, the invention accomplishes this objective by performing collar feed and swaging functions through a single tool having both collar placement and swaging capabilities. In a first stage of operation, a collar feed mechanism is located directly in front of the nose assembly of a swaging tool so that a collar previously fed into a presentation position may be placed onto a lockbolt shank. The collar feed mechanism is then moved automatically out of the way of the swaging tool's nose assembly to allow the nose assembly to advance onto the lockbolt and collar for swaging purposes. When the tool is withdrawn, the collar feeder automatically returns to collar placement position.

In the illustrated embodiment, hereinafter shown and described, the movement of the collar feed is performed by way of a spring biased contact pin having a cam track that causes the collar feeder to swing to one side, while the nose assembly is advanced linearly and axially onto the lockbolt/collar combination for swaging purposes.

In the illustrative embodiment shown and described in detail, the lockbolt feeder comprises an L-shaped body or "track" which is pivotally mounted to an otherwise substantially conventional swaging tool. Collars are fed through a channel in the L-shaped feeding body until the lead collar in a series of collars in the track is in a presentation position in direct axial alignment with the nose assembly and in direct axial alignment with a lockbolt shank. As the tool, including the collar feeder, is advanced axially, a contact pin carried out by the tool causes the feeder to swing out of the axial position thereby unblocking the nose assembly and allowing the nose assembly to move over the collar where, at the operator's command, the swaging tool swages the collar and, where appropriate, snap off the pintail and dispose of it in an appropriate fashion. When the tool is withdrawn, the feeder swings back into position in front of the swaging tool nose assembly.

In the illustrative embodiment herein shown and described in detail, the collar feeder includes, in addition to the L-shaped feeder track member, a cartridge having a spiral internal track for holding a relatively large number of collars in side-by-side relationship where they can be fed into the track body under the force of air pressure from a compressor. This is but one type of collar supply mechanism that can be used in combination with the present invention. For example, a long flexible tube-type magazine can also be used. Still other variations will occur to persons skilled in the art of lockbolt fastening systems.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying photographs, the latter being briefly described hereinafter.

BRIEF SUMMARY OF THE DRAWINGS

The description herein makes reference to the accompanying drawings wherein like reference numerals refer to like parts throughout the several views and wherein:

FIG. 1 is a side view of a swaging tool with a collar feeder directly in front of a pintail-type lockbolt;

FIG. 2 is a side view of the tool after it has been partially advanced onto the lockbolt;

DETAILED DESCRIPTION OF THE ILLUSTRATIVE EMBODIMENT

Figure 3:
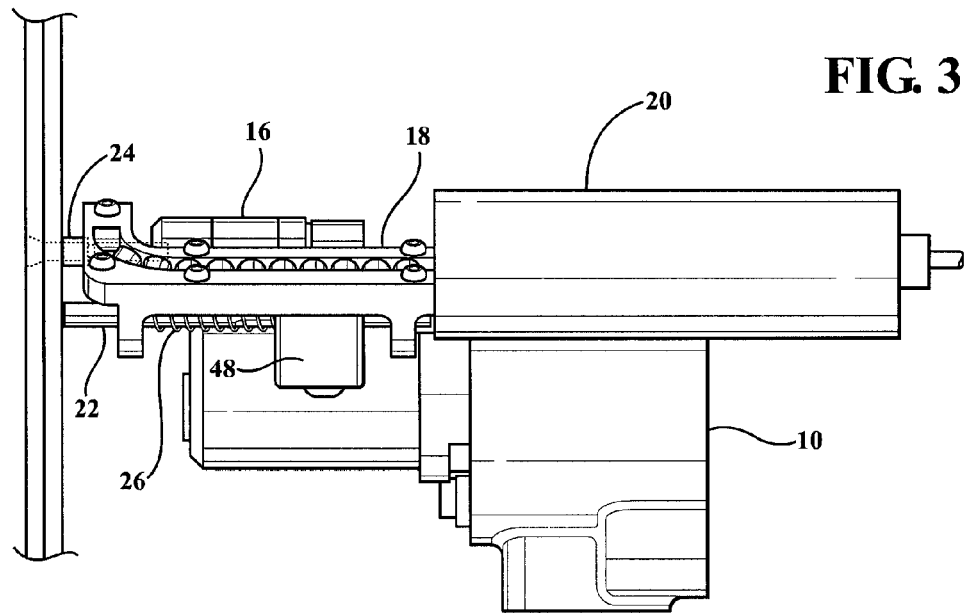
FIG. 3 is a side view of the swaging tool after it has been fully advanced onto the lockbolt and the collar feeder has swung to one side.

Referring to the figures, there is shown a swaging tool 10 which, in conventional form, is adapted to install swagable collars 24 onto the shanks of lockbolts 14 used to join sheets of material 12 in any of a variety of construction operations. The tool operates in a conventional fashion through a nose assembly 16 to swage the collars 24 onto the shanks of the lockbolts 14 by inelastic deformation and, in this case, to break off the pintail 15 of the lockbolt 14.

In the illustrated embodiment, the swaging tool 10 has been altered through the addition of a collar feed mechanism, including an L-shaped collar track, the details of which are best illustrated in FIGS. 3, 4, 7, and 8, to feed collars to a presentation position normally located just in front of the nose assembly 16 from a cylindrical cartridge 20 having a spiral L-shaped track formed therein. The collars are urged from the cartridge 20 to and through the track 18 to the presentation position by air pressure supplied by through a line 21 from a source such as a compressor or accumulator.

The collar feed track 18 is attached to the tool 10 by means of a forwardly protruding contact pin 22 which extends through flanges 50 and 52 on the bottom of the track 18 and into a block 48 which is attached onto the side of the tool 10 to form an anchor point for the collar feed track 18 and the cartridge 20.

The contact pin 22 operates in the manner of a plunger which can be pushed through the flanges 50, 52 and the block 48, resistance to depression being created by a compression spring 26 disposed between the inside surface of the flange 50 and the outside surface of the block 48.

Figure 8:
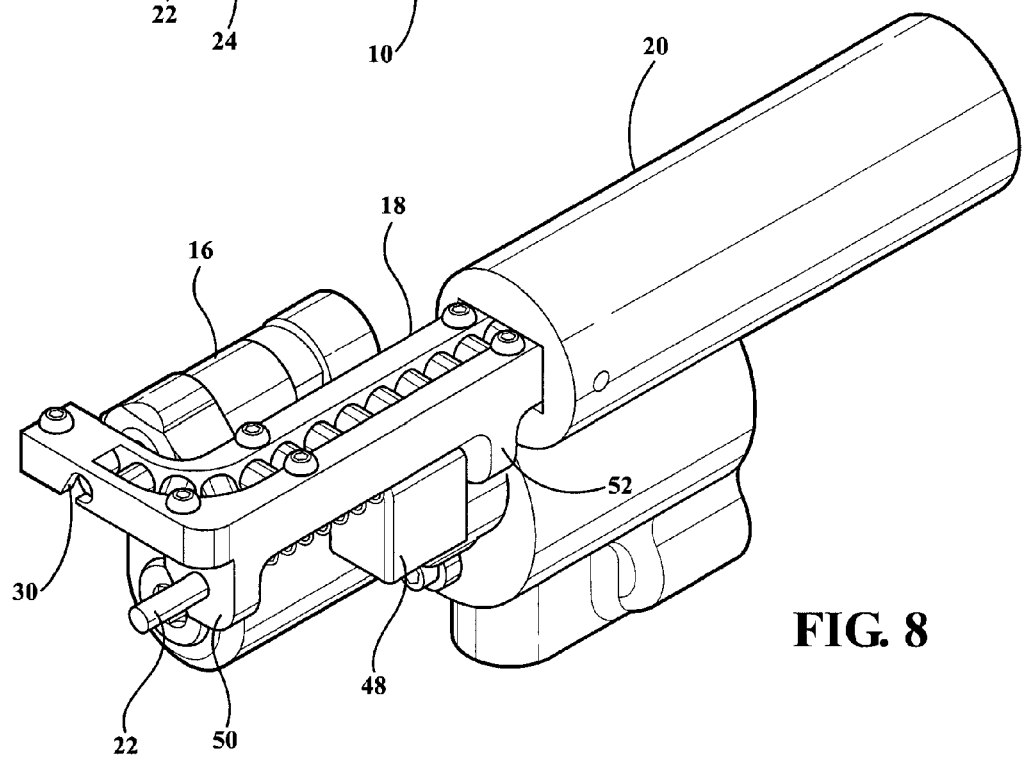
FIG. 8 is a perspective view of the swaging tool with the feeder returned to the collar placement position.
Figure 9:
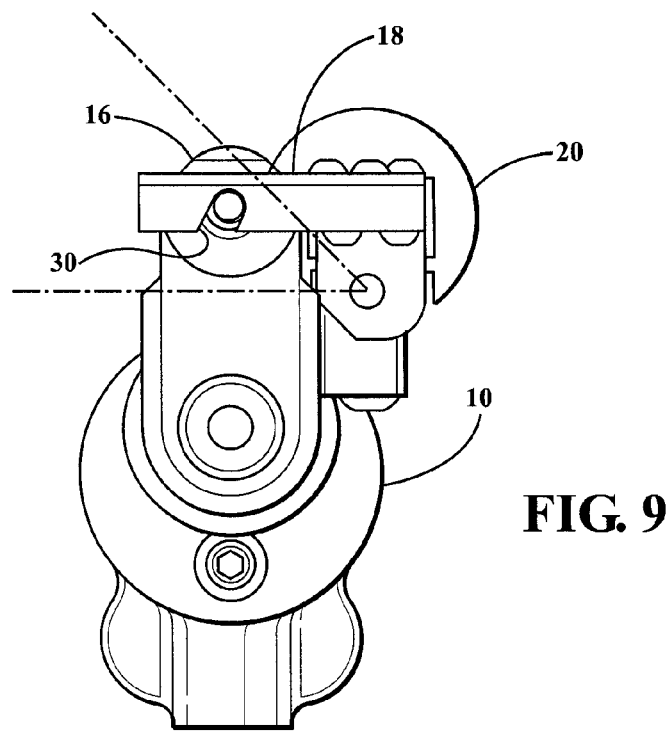
FIG. 9 is a front view of the tool with the collar feeder in a placement position.
Figure 11:
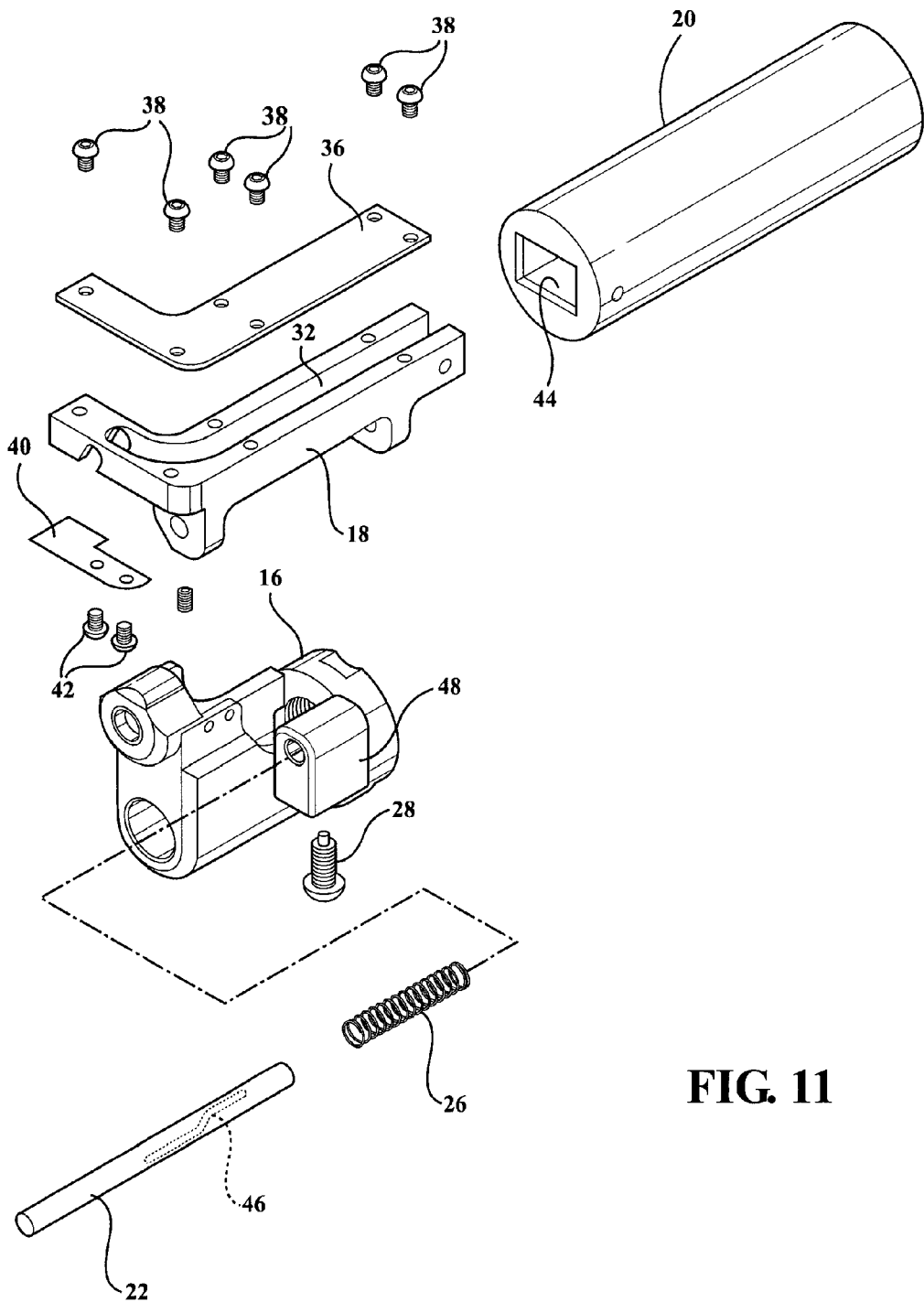
FIG. 11 is an exploded view of the swaging tool nose assembly and collar feeder.

As shown in FIG. 11, a cam track 46 is formed in the side of the pin 22 to receive the end of a screw 28 which is fixed to the block 48. Accordingly, depressing the contact pin 22 into the block 48 causes rotation of the pin 22 and the collar track 18 relative to the axis of the pin 22. This rotation moves the presentation end of the cam track 18 out of its normal position directly in front of the nose assembly 16 to the raised position shown in FIGS. 4 and 7 so that nose assembly 16 can be advanced onto the collar 24 which is now located on the shank of the lockbolt 14 to perform the swaging operation. Once the tool 10 is pulled away from the now swaged collar and the lockbolt on which it is swaged, the pin 22 moves forwardly causing the cam track 18 to swing back into the presentation position in front of the nose assembly 16 as shown in FIGS. 8 and 9.

Describing the apparatus shown in the figures in greater detail, the collar track member 18 is essentially L-shaped and has formed therein a channel 32 which is dimensioned so as to receive a row of side-by-side swagable collars 24 from the cartridge 20 and move those collars along the track until they arrive at the presentation position defined by the combination of the notch 30 in the end of the track member 18 and a retention spring 40 is held to the track member 18 by means of screws 42. The retention spring acts as a flap to allow a collar 24, once it has been positioned on the shank of a lockbolt 14 as shown in FIG. 3 to be pulled out of the notch 30. This in turn allows the next collar in the row formed by the channel 32 to advance into the presentation position where it is ready to be placed on the next lockbolt shank in a series of swaging operations.

The channel 32 is covered by a transparent plastic plate 36 held in place by screws 38 so that the operator can see the collars in the track and know that he or she has a supply of collars for application to the shanks of lockbolts during an assembly operation.

The sequence of steps carried out by the tool 10 with the modification described above and illustrated in the drawings is essentially as follows.

The tool 10 with the collar track 18 in the presentation position directly in front of the nose assembly 16 and the contact pin 22 fully extended as shown in FIG. 1. The nose assembly is now lined up with the shank or pintail 15 of the lockbolt 14. The operator then advances the tool toward the shank of the lockbolt 14 until the contact pin 22 abuts against the surface of the workpiece 12 as shown in FIG. 2. The operator then advances the tool 10 toward the workpiece 12, placing the collar in the notch 30 of the track 18 onto the shank of the lockbolt 14 and, at the same time, depressing the contact pin 22 to begin rotating or swinging the L-shaped track around the axis of the contact pin 22 out of its position directly in front of the nose assembly 16 as shown in FIGS. 3 and 4.

The tool 10 is then further advanced fully onto the placed collar and the tool trigger is depressed to operate the nose assembly 16 to swage the collar onto the shank of the lockbolt 14.

Figure 5:
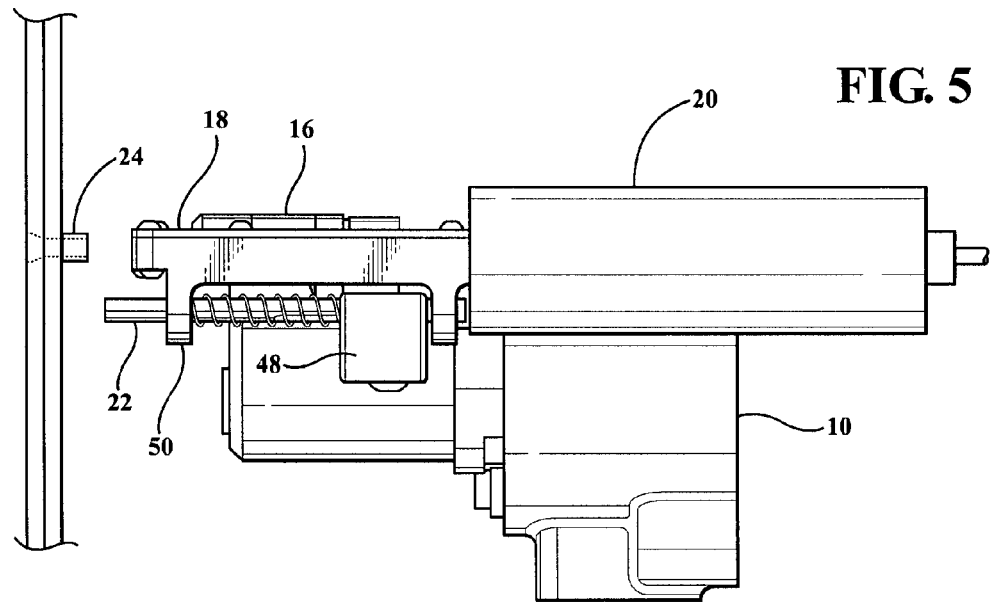
FIG. 5 is a side view of the tool after the swaging step is performed and the tool has been withdrawn.
Figure 6:
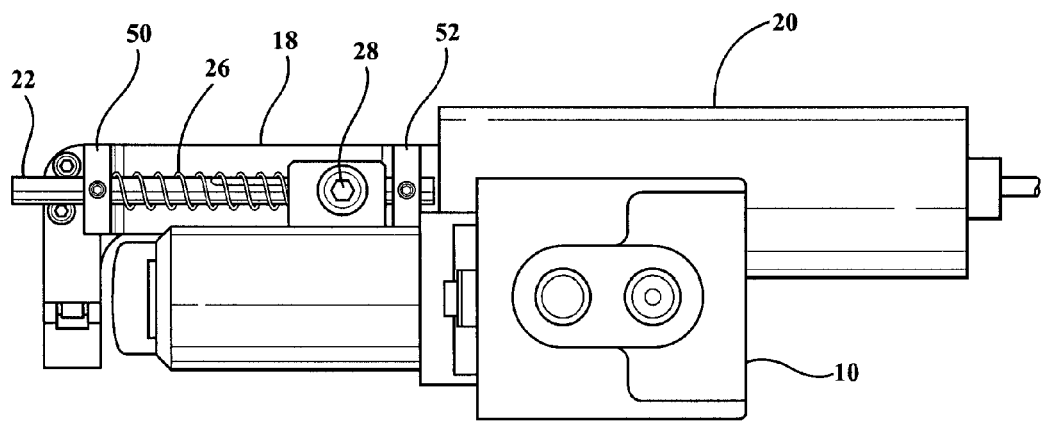
FIG. 6 is a bottom view of the swaging tool.

The tool 10 is withdrawn as shown in FIG. 5 with the collar 24 now fully swaged onto the shank of the lockbolt 14 and the pintail 15 broken away. The contact pin 22 is now allowed to extend forwardly by the compression spring and the cam track rotates the loaded collar track 18 back into position directly in front of the nose assembly 16 as shown in FIGS. 5 and 6.

Figure 4:
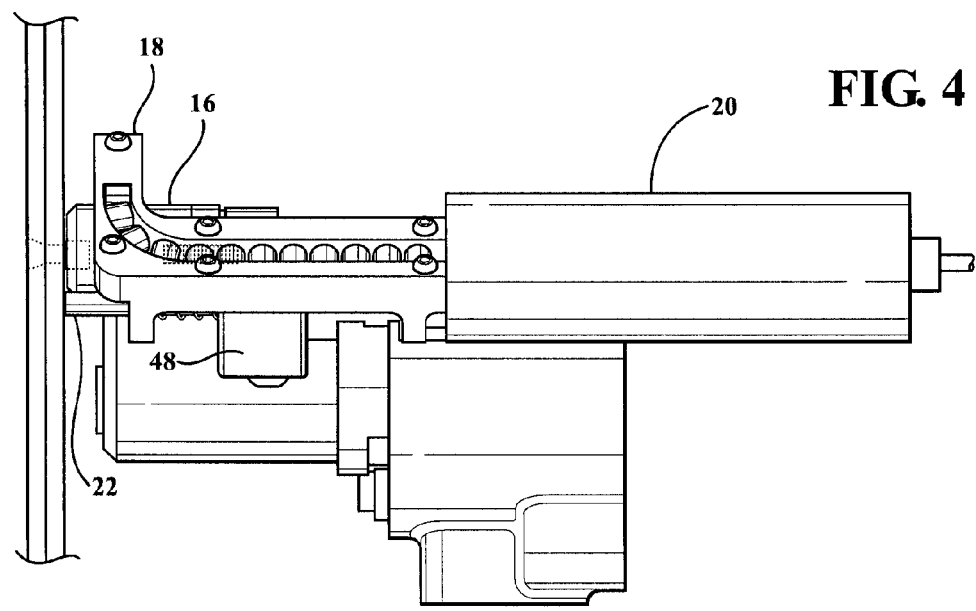
FIG. 4 is a side view of the swaging tool fully advanced onto the lockbolt.
Figure 7:
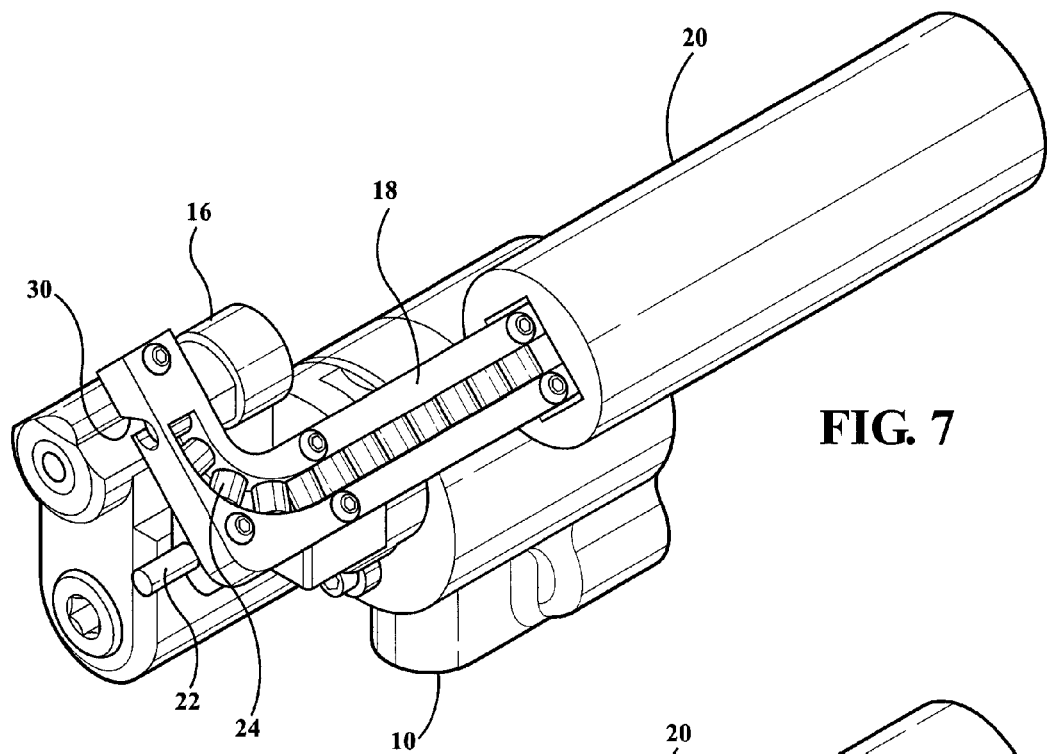
FIG. 7 is a perspective view of the swaging tool with the collar feeder swung out of the collar placement position.

FIG. 7 shows the tool 10 in a position which corresponds to FIG. 4. FIG. 8, on the other hand, shows the track member 18 swung back to the presentation position wherein a collar in the slot is directly in front of the nose assembly 16 for placement onto the next lockbolt to be fully installed.

Figure 10:
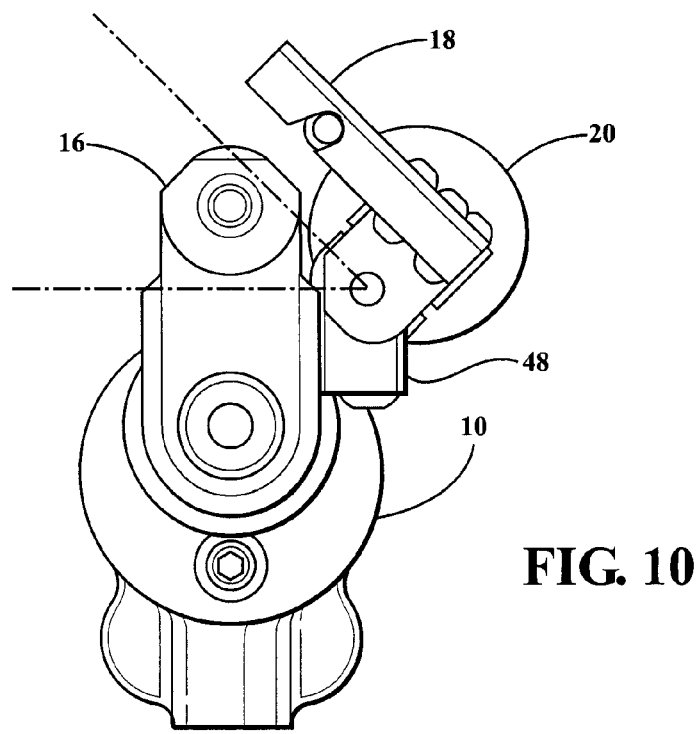
FIG. 10 is a front view of the tool with the collar feeder swung out of the way of the swaging nose assembly.

FIG. 9 shows the angle of approximately 45° through which the track assembly 18 is rotated by the camming operation of the contact pin 22 as it is depressed by virtue of the fact that the operator forces the tool 10 against the workpiece 12 to carry out the swaging operation. In the raised position shown in FIG. 10, the track member 18 is fully clear of the nose assembly 16 so as to allow the swaging operation to be carried out.

The track member 18 and the mechanism for swinging it back and forth between the presentation and swaging positions is readily installed on a conventional tool by attaching the block 48 to the body of the tool and installing the balance of the components by means of the structure shown in FIG. 11.

The cartridge 20 has an opening 44 which receives the back end of the track member 18. Within the cartridge is a spiral track 23 in which collars are loaded in side-by-side relationship so that they feed directly into the channel 32 in the track member 18. The cartridge is designed, in this case, to hold approximately 48 swagable collars. However, larger and smaller cartridges, and other magazines for supplying collars to the track member 18 can be used. The spring 26 acts as a bias member to store energy as the contact pin 22 is depressed, and release that energy so as to push the contact pin back into the extended position shown in FIG. 1 and allow the track member 8 to swing back into the presentation position directly in front of the nose assembly 16.

In summary, an otherwise conventional swaging tool 10 is modified to receive a collar track device that moves between presentation and swage-allowing positions as the operator advances the nose assembly of the tool onto a collar which has been placed onto the thank of a lockbolt for swaging purposes. The swinging action of the collar feeder is produced by advancing and retracting the tool so as to compress and then release the contact pin 20 to produce a camming action which is coordinated with the advance and retraction of the tool 10 during a swaging operation. The entire procedure can be carried out repeatedly by an operator by using only one hand and without the necessity for moving back and forth between collar loading and collar swaging operations; i.e., it is essentially a single operator maneuver to both place and swage a collar onto a collar of a lockbolt 14.

A preferred material for the track member 18 is aluminum, although steel may also be used to advantage because of its higher resistance to wear. As stated above, the material for the plate 36 is preferably a transparent or translucent polymer so that the operator can monitor the number of collars that are available for presentation and determine when a fresh cartridge or magazine is needed. Service of the device is simple as the collar feeder system including the track member 18 is readily removed.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A lockbolt collar placement and swaging tool comprising:
    a swaging tool having a nose assembly adapted to engage a lockbolt pre-mounted in a work piece along the longitudinal axis thereof and perform a swaging operation on a swagable collar placed on said lockbolt;
    a collar feeder mounted to said tool laterally adjacent said longitudinal axis and adapted for movement from a first position where said feeder presents collars one at a time for axial placement onto a lockbolt in axial alignment with said nose assembly, to a second position where said feeder is laterally out of axial alignment with said nose assembly to allow the nose assembly to advance onto said lockbolt;
    an operator selectable mechanism for producing movement of the collar feeder from the first position to the second position to place an unswagged collar on said lockbolt, and from the second position, back to the first position after said collar has been swaged;
    said operator selectable mechanism comprising a spring biased contact pin having an axis of displacement parallel to the axis of the nose assembly, said pin being axially depressed by contact with said work piece to produce said movement as the nose assembly is urged by an operator toward said lockbolt and said work piece, said contact pin further comprising a spiral cam track formed therein such that axial depression of said pin causes movement of the feeder between said first and second positions.

2. The lockbolt collar placement and swaging tool as defined in claim 1 wherein the feeder comprises an L-shaped body with an internal track dimensioned to hold a series of swagable lockbolt collars in side-by-side condition and a power supply for urging the collars toward an endpoint on the L-shaped body where a collar can be released onto a lockbolt.

3. The lockbolt collar placement and swaging tool as defined in claim 2 wherein the L-shaped body is connected to a cartridge having an internal track for holding a plurality of unthreaded collars and feeding said collars into the track of said L-shaped body.

4. The lockbolt collar placement and swaging tool as defined in claim 2 wherein the power supply is an air supply.

* * * * *